US009009747B2

(12) United States Patent
Miller, IV

(10) Patent No.: US 9,009,747 B2
(45) Date of Patent: *Apr. 14, 2015

(54) GESTURE CATALOGING AND RECOGNITION

(75) Inventor: Thomas M. Miller, IV, Los Angeles, CA (US)

(73) Assignee: Sony Computer Entertainment America, LLC, San Mateo, CA (US)

(*) Notice: Subject to any disclaimer, the term of this patent is extended or adjusted under 35 U.S.C. 154(b) by 577 days.

This patent is subject to a terminal disclaimer.

(21) Appl. No.: 13/367,222

(22) Filed: Feb. 6, 2012

(65) Prior Publication Data

US 2012/0200491 A1 Aug. 9, 2012

Related U.S. Application Data

(63) Continuation of application No. 12/337,477, filed on Dec. 17, 2008, now Pat. No. 8,225,343.

(60) Provisional application No. 61/020,669, filed on Jan. 11, 2008.

(51) Int. Cl.
G06K 9/00 (2006.01)
A63F 13/98 (2014.01)
(Continued)

(52) U.S. Cl.
CPC ............ *G06K 9/00355* (2013.01); *A63F 13/02* (2013.01); *A63F 13/06* (2013.01); *A63F 2300/105* (2013.01); *A63F 2300/1093* (2013.01);
(Continued)

(58) Field of Classification Search
USPC ................ 725/10, 12, 133, 141, 153
See application file for complete search history.

(56) References Cited

U.S. PATENT DOCUMENTS 6,347,290 B1 2/2002 Bartlett
7,239,301 B2 7/2007 Liberty et al.
(Continued)

FOREIGN PATENT DOCUMENTS

DE 10300676 5/2004
EP 0629988 12/1994
(Continued)

OTHER PUBLICATIONS

Japanese Non Final Office Action dated Jul. 17, 2013 for Japanese Application No. 2012-079635.
(Continued)

*Primary Examiner* — Kieu Oanh T Bui
(74) *Attorney, Agent, or Firm* — Joshua D. Isenberg; JDI Patent

(57) ABSTRACT

Methods and apparatus for cataloging and recognizing gestures are disclosed. A gesture may be detected using sample motion data. An energy value and baseline value may be computed. The baseline value may be updated if the energy value is below a calm energy threshold. The sample motion data may be adjusted based on the updated baseline value. A local variance may be calculated over a number of samples. Sample motion data values may be recorded if the local variance exceeds a threshold. Sample motion data recording may stop if a local variance scalar value falls below a drop threshold. Input Gestures may be recognized by computing a total variance for sample values in an Input Gesture; calculating a figure of merit using sample values from the Input Gesture and one or more Catalog Gestures; and determining whether the Input Gesture matches a Catalog Gesture from the figure of merit.

21 Claims, 7 Drawing Sheets

(51) Int. Cl.
*A63F 13/20* (2014.01)
*G06F 3/01* (2006.01)
*G06F 3/0346* (2013.01)
*G06F 3/0481* (2013.01)
*G06K 9/22* (2006.01)

(52) U.S. Cl.
CPC ......... *A63F 2300/6045* (2013.01); *G06F 3/017* (2013.01); *G06F 3/0346* (2013.01); *G06F 3/04815* (2013.01); *G06K 9/224* (2013.01)

(56) References Cited

U.S. PATENT DOCUMENTS

| | | | |
|---|---|---|---|
| 7,333,090 | B2 | 2/2008 | Tanaka et al. |
| 7,492,367 | B2 | 2/2009 | Mahajan et al. |
| 7,918,733 | B2 | 4/2011 | Zalewski et al. |
| 8,225,343 | B2 * | 7/2012 | Miller, IV ........................ 725/12 |
| 2004/0207597 | A1 | 10/2004 | Marks |
| 2005/0212751 | A1 | 9/2005 | Marvit et al. |
| 2005/0253806 | A1 | 11/2005 | Liberty et al. |
| 2006/0233389 | A1 | 10/2006 | Mao et al. |
| 2006/0239471 | A1 | 10/2006 | Mao et al. |
| 2006/0252477 | A1 | 11/2006 | Zalewski et al. |
| 2006/0256081 | A1 | 11/2006 | Zalewski et al. |
| 2006/0277571 | A1 | 12/2006 | Marks et al. |
| 2006/0287086 | A1 | 12/2006 | Zalewski et al. |
| 2007/0025562 | A1 | 2/2007 | Zalewski et al. |
| 2007/0260340 | A1 | 11/2007 | Mao |
| 2008/0300055 | A1 | 12/2008 | Lutnick et al. |
| 2010/0214216 | A1 | 8/2010 | Nasiri et al. |
| 2012/0135805 | A1 | 5/2012 | Miller, IV |

FOREIGN PATENT DOCUMENTS

| | | |
|---|---|---|
| EP | 2079004 | 7/2009 |
| GB | 2419433 | 4/2006 |
| JP | 2005122492 A | 5/2005 |
| JP | 2007535773 | 12/2007 |
| JP | 2007535773 A | 12/2007 |
| WO | 2005109879 | 11/2005 |
| WO | 2007130791 A | 11/2007 |
| WO | 2007078639 | 12/2007 |

OTHER PUBLICATIONS

"Notification of Reason(s)for Refusal" Letter dated Feb. 14, 2012 issued by Japanese Patent Office for Japanese patent application No. 2009-003121.
Office Letter dated Aug. 30, 2010 issued by European Patent Office for European Patent Application No. 09250052.9.
"A Framework for 3D Spatial Gesture Design and Modeling Using a Wearable Input Device", Wearable Computers, 2007 11th IEEE International Symposium On, IEEE,Oct. 11, 2007, Doo Young Kwon, et al.
"Gestures are strings: Efficient online gesture spotting and classification using string matching", Proc.2nd Int. Conf. On Body Area Networks, 2007, Stiefmeier, Thomas, et al.
European Search Report dated May 20, 2009 for European patent application No. 09250052.9.
Notice of Allowance mailed date, Oct. 28, 2011 for U.S. Appl. No. 12/337,477, entitled "Gesture Cataloging and Recognition".
Non-Final Office issued date May 13, 2011 for U.S. Appl. No. 12/337,477.
U.S. Appl. No. 61/020,669, filed Jan. 11, 2008.
U.S. Appl. No. 13/367,089, filed Feb. 6, 2012 , entitled "Gesture Cataloging and Recognition".
Extended European Search Report mailed date Jun. 5, 2013 issued for European Patent Application No. 11166272.2.
Non-Final Office Action mailed date Apr. 9, 2013, issued for U.S. Appl. No. 13/367,089.
Final Office Action for U.S. Appl. No. 13/367,089, dated Sep. 12, 2013.
Non-Final Office Action for U.S. Appl. No. 13/367,089, dated Dec. 2, 2013.
European Office Action for EP Application No. 11166272.2, dated May 6, 2014.
Notice of Allowance for U.S. Appl. No. 13/367,089, dated May 9, 2014.
US 8,132,199, 03/2012, Miller, IV (withdrawn)

* cited by examiner

GESTURE CATALOGING AND RECOGNITION

CLAIM OF PRIORITY

This application is a continuation of U.S. patent application Ser. No. 12/337,477 to Thomas Miller IV entitled "GESTURE CATALOGING AND RECOGNITION", filed Dec. 17, 2008 now U.S. Pat. No. 8,225,343 the disclosure of which is hereby incorporated herein by reference, which claims the benefit of the filing date of U.S. Provisional Patent Application No. 61/020,669 filed Jan. 11, 2008, the disclosure of which is hereby incorporated herein by reference.

This application claims the benefit of the filing date of U.S. Provisional Patent Application No. 61/020,669 to Thomas Miller IV entitled "GESTURE CATALOGING AND RECOGNITION", filed Jan. 11, 2008, the disclosure of which is hereby incorporated herein by reference.

CROSS-REFERENCE TO RELATED APPLICATION

This application is related to commonly-assigned, co-pending application Ser. No. 13/367,089, entitled GESTURE CATALOGING AND RECOGNITION, filed the same day as the present application, the entire disclosures of which are incorporated herein by reference.

FIELD OF THE INVENTION

The present invention relates generally to computer entertainment systems, and more specifically to a user's manipulation of a controller for such computer entertainment systems.

BACKGROUND OF THE INVENTION

Computer entertainment systems typically include a hand-held controller, game controller, or other controller. A user or player uses the controller to send commands or other instructions to the entertainment system to control a video game or other simulation being played. For example, the controller may be provided with a manipulator, such as a joystick, which is operated by the user. The amount of deflection of the joystick is converted from an analog value into a digital value, which is sent to the game machine console. The controller may also be provided with buttons that can be operated by the user. Although they are widely used, joystick controllers can be somewhat awkward and counterintuitive to use.

It is with respect to these and other background information factors that the present invention has evolved.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the examples of embodiments of the invention described below are set forth without any loss of generality to, and without imposing limitations upon, the claimed invention.

Various embodiments of the methods, apparatus, schemes and systems described herein provide for the detection, capture and tracking of the movements, motions and/or manipulations of the entire controller body itself by the user. The detected movements, motions and/or manipulations of the entire controller body by the user may be used as additional commands to control various aspects of the game or other simulation being played.

Detecting and tracking a user's manipulations of a game controller body may be implemented in different ways. For example, in some embodiments an inertial sensor, such as an accelerometer or gyroscope, can be used with the computer entertainment system to detect motions of the hand-held controller body and transfer them into actions in a game. The inertial sensor can be used to detect many different types of motions of the controller, such as for example up and down movements, twisting movements, side to side movements, jerking movements, wand-like motions, plunging motions, etc. Such motions may correspond to various commands such that the motions are transferred into actions in a game.

Detecting and tracking the user's manipulations of a game controller body can be used to implement many different types of games, simulations, etc., that allow the user to, for example, engage in a sword or lightsaber fight, use a wand to trace the shape of items, engage in many different types of sporting events, engage in on-screen fights or other encounters, etc.

Figure 1:
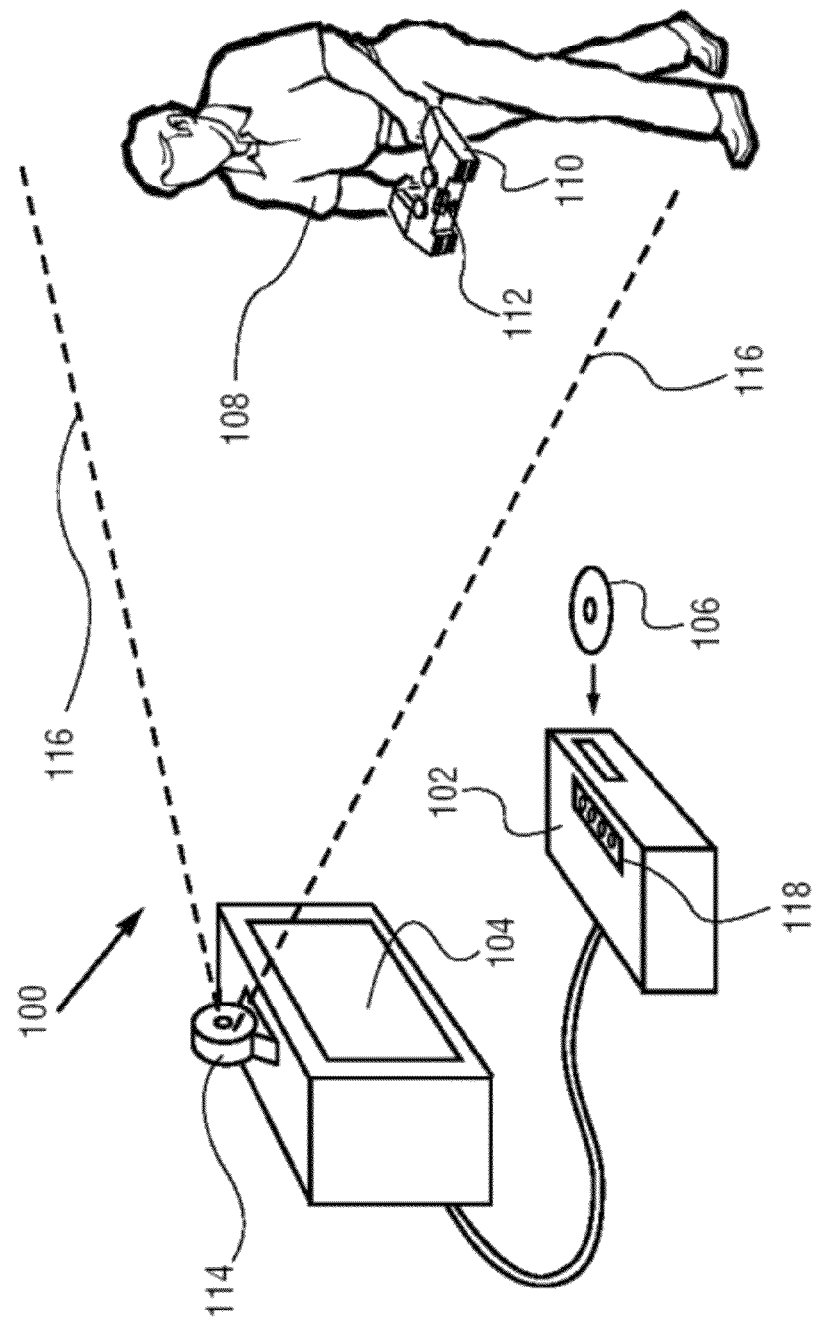
FIG. 1 is a pictorial diagram illustrating a video game system that operates in accordance with an embodiment of the present invention.
Figure 2:
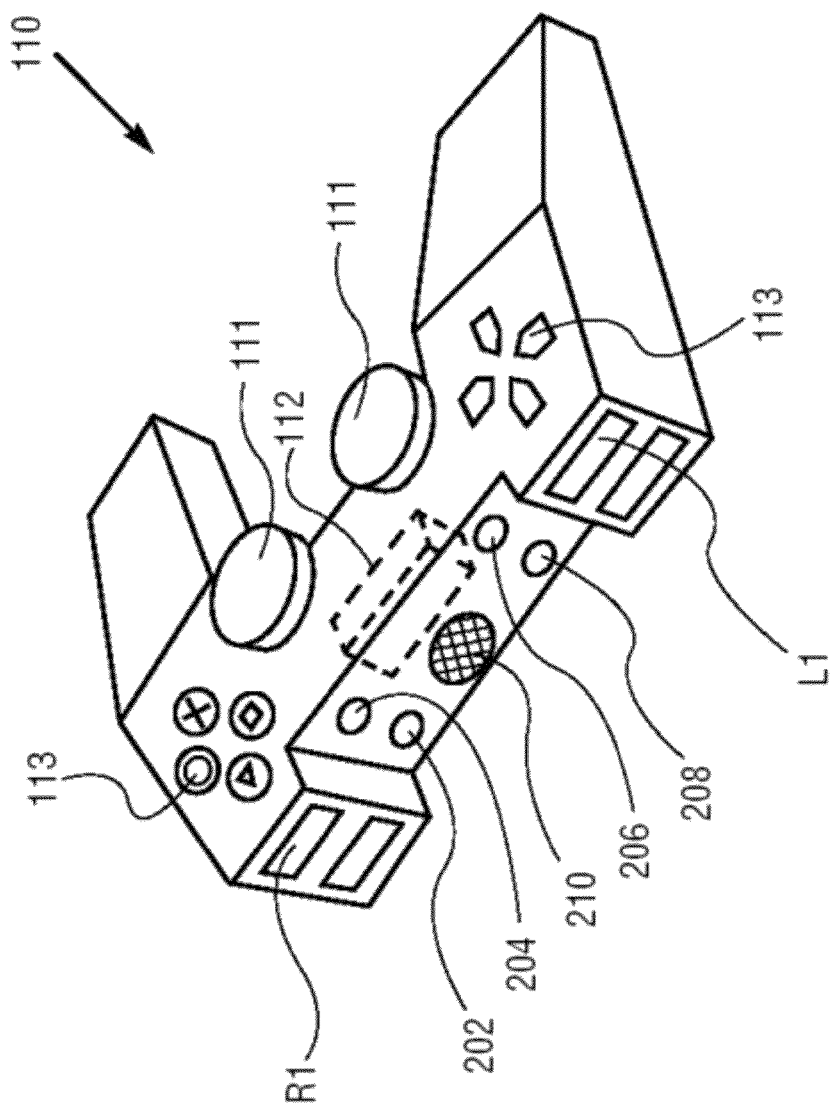
FIG. 2 is a perspective view of a controller made in accordance with an embodiment of the present invention.

Referring to FIG. 1, there is illustrated a system 100 that may be configured to operate in accordance with an embodiment of the present invention. As illustrated, the system 100 may include a computer entertainment console 102 coupled to a television or other video display 104 to display the images of the video game or other simulation thereon. The game or other simulation may be stored on a DVD, CD, flash memory, USB memory, or other memory media 106 that is inserted into the console 102. A user or player 108 may manipulate a game controller 110 to control the video game or other simulation. As seen in FIG. 2, the game controller 110 may include an inertial sensor 112 that produces signals in response to the position, motion, orientation or change in orientation of the game controller 110. In addition to the inertial sensor 112, the game controller 110 may include conventional control input devices, e.g., joysticks 111, buttons 113, R1, L1, and the like.

During operation, the user 108 may physically move the controller 110. By way of example, the controller 110 may be moved in any direction by the user 108, such as up, down, to one side, to the other side, twisted, rolled, shaken, jerked, plunged, etc. These movements of the controller 110 itself may be detected through analysis of signals from the inertial sensor 112 in a manner described below.

Referring again to FIG. 1, the system 100 may optionally include a camera or other video image capturing device 114, such as a digital camera, which may be positioned so that the controller 110 is within the camera's field of view 116. Analysis of images from the image capturing device 114 may be used in conjunction with analysis of data from the inertial sensor 112. As shown in FIG. 2, the controller may optionally be equipped with light sources such as light emitting diodes (LEDs) 202, 204, 206, 208 to facilitate tracking by video analysis. Analysis of such video images for the purpose of tracking the controller 110 are described, e.g., in U.S. patent application Ser. No. 11/382,037, entitled "SCHEME FOR DETECTING AND TRACKING USER MANIPULATION OF A GAME CONTROLLER BODY" (published as U.S. Patent Application Publication 2006-027086), which is incorporated herein by reference. The console 102 may include one or more acoustic sensors, e.g., a microphone array 118. Furthermore, the controller 110 may include an acoustic signal generator 210 (e.g., a speaker as shown in FIG. 2) to provide a source of sound to facilitate acoustic tracking of the controller 110 with the microphone array 118 and appropriate acoustic signal processing. Examples of such signal processing are described, e.g., in U.S. patent application Ser. No. 11/381,724 (Published as US Patent Application Publication 2006-0233389), which is incorporated herein by reference.

In certain embodiments of the invention, signals from the inertial sensor 112 may used to generate position and orientation data for the controller 110. Such data may be used to calculate many physical aspects of the movement of the controller 110, such as for example its acceleration and velocity along any axis, its tilt, pitch, yaw, roll, as well as any telemetry points of the controller 110. As used herein, telemetry generally refers to remote measurement and reporting of information of interest to a system or to the system's designer or operator.

The ability to detect and track the movements of the controller 110 makes it possible to determine whether any predefined movements of the controller 110 are performed. That is, certain movement patterns or gestures of the controller 110 may be predefined and used as input commands for the game or other simulation. For example, a plunging downward gesture of the controller 110 may be defined as one command, a twisting gesture of the controller 110 may be defined as another command, or a shaking gesture of the controller 110 may be defined as another command, and so on. In this way the manner in which the user 108 physically moves the controller 110 may be used as an input for controlling the game. Controlling the game in this manner may provide a more stimulating and entertaining experience for the user.

Figure 3A:
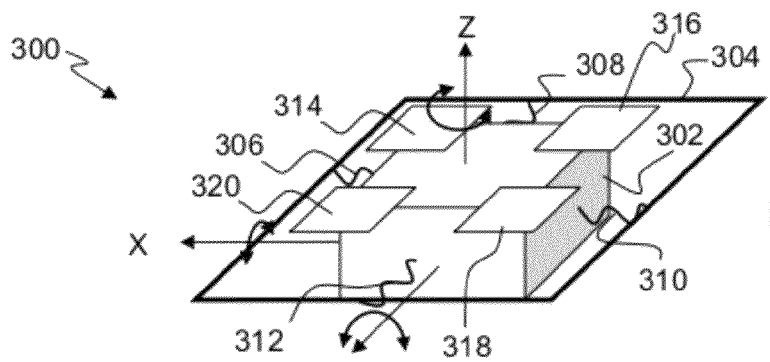
FIG. 3A is a three-dimensional schematic diagram illustrating an accelerometer that may be used in a controller according to an embodiment of the present invention.

By way of example and without limitation, the inertial sensor 112 may be an accelerometer. FIG. 3A depicts an example of an accelerometer 300 in the form of a simple mass 302 elastically coupled at four points to a frame 304, e.g., by springs 306, 308, 310, 312. Pitch and roll axes (indicated by X and Y, respectively) lie in a plane that intersects the frame. A yaw axis Z is oriented perpendicular to the plane containing the pitch axis X and the roll axis Y. The frame 304 may be mounted to the controller 110 in any suitable fashion. As the frame 304 (and the joystick controller 110) accelerates and/or rotates the mass 302 may displace relative to the frame 304 and the springs 306, 308, 310, 312 may elongate or compress in a way that depends on the amount and direction of translational and/or rotational acceleration and/or the angle of pitch and/or roll and/or yaw. The displacement and of the mass 302 and/or compression or elongation of the springs 306, 308, 310, 312 may be sensed, e.g., with appropriate sensors 314, 316, 318, 320 and converted to signals that depend in known or determinable way on the amount acceleration of pitch and/or roll.

There are a number of different ways to track the position of the mass and/or or the forces exerted on it, including resistive strain gauge material, photonic sensors, magnetic sensors, hall-effect devices, piezoelectric devices, capacitive sensors, and the like. Embodiments of the invention may include any number and type or combination of types of sensors. By way of example, and without limitation, the sensors 314, 316, 318, 320 may be gap-closing electrodes placed above the mass 302. A capacitance between the mass and each electrode sensor may change as the position of the mass changes relative to each electrode. Each electrode may be connected to a circuit that produce a signal related to the capacitance (and therefore to the proximity) of the mass 302 relative to the electrode. Alternatively, the springs 306, 308, 310, 312 may include resistive strain gauge sensors that produce signals related to the compression or elongation of the springs. Furthermore, the sensors 314, 316, 318, 320 may implement some combination of both capacitance sensing and strain gauge sensing.

In some embodiments, the frame 304 may be gimbal mounted to the controller 110 so that the accelerometer 300 maintains a fixed orientation with respect to the pitch and/or roll and/or yaw axes. In such a manner, the controller axes X, Y, Z may be directly mapped to corresponding axes in real space without having to take into account a tilting of the controller axes with respect to the real space coordinate axes.

Figure 3B:
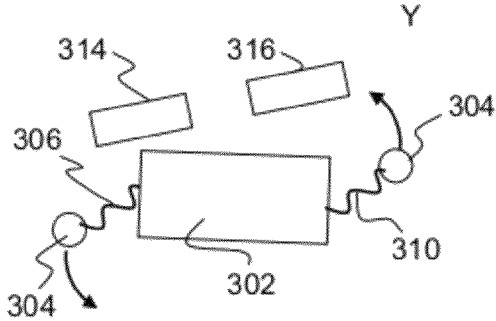
FIG. 3B is a cross-sectional schematic diagram illustrating the accelerometer of FIG. 3A in a state of rotation about a pitch or roll axis.
Figure 3C:
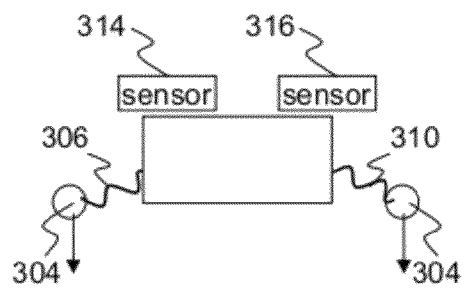
FIG. 3C is a cross-sectional schematic diagram illustrating the accelerometer of FIG. 3A in a state of translational acceleration.
Figure 3D:
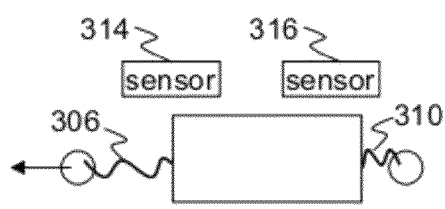
FIG. 3D is a top plan view schematic diagram illustrating the accelerometer of FIG. 3A in a state of rotational acceleration about a yaw axis.
Figure 3E:
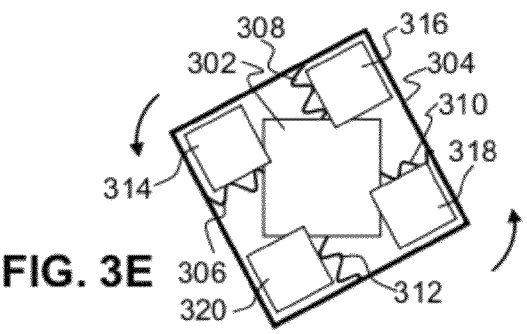
FIG. 3E is a top plan view schematic diagram illustrating the accelerometer of FIG. 3A in a state of rotational acceleration about a yaw axis.

FIGS. 3B-3D illustrate examples of different elongation and compressions for the springs 306, 308, 310, 312 under different conditions of acceleration and/or rotation. Specifically, FIG. 3B depicts a situation wherein the frame 304 has been rotated about the Y axis. Due to the force of gravity acting the mass 302, the springs 306, 310 may elongate and the mass 302 may be brought closer to sensors 314, 318 and further away from sensors 316, 320. Rotation about the Y (roll) axis in the opposite sense may similarly elongate the springs 306, 310, but may bring the mass closer to sensors 316, 320 and further from sensors 314, 318. Similarly, rotation about the X (pitch) axis may elongate springs 308, 312 and bring the mass closer to sensors 314, 316 and further from sensors 318, 320, depending on the direction of rotation.

FIG. 3C depicts a situation in which the frame 304 has been accelerated sharply downwards (as indicated by the arrows) while remaining level. In this situation all four springs 306, 308, 310, 312 may elongate and the mass may be brought closer to all four sensors 314, 316, 318, 320. In FIG. 3D the frame 304 is accelerated to the left (as indicated by the arrow) while remaining level. In this situation, springs 306, 308, and 312 may elongate while spring 310 may be compressed. The mass 302 may move away from sensors 314, 318 and closer to sensors 316, 320. FIG. 3D depicts a situation in which the frame 304 has been given an angular acceleration about the Z (yaw) axis that produces an elongation of all four springs 306, 308, 310, 312 and moves the mass 302 away from all four sensors 314, 316, 318, 320. As may be seen from FIGS. 3B-3E, different motions and/or orientations of the frame 304 therefore produce particular combinations of signals that may be analyzed to determine the orientation and/or motion of the frame 304 (and the controller 110).

In the absence of external forces acting on the mass 302 the displacement of the mass 302 from a rest position along the Z axis is roughly proportional to the amount of acceleration along the Z axis. The detectors 314, 316, 318, 320 produce signals that are proportional to the displacement of the mass 302 and are, therefore, proportional to the acceleration of the frame 304 (and controller 110) along the Z axis. In a similar fashion, signals from the sensors may be used to deduce acceleration along the X and Y axes. It is noted that, in the force of gravity may act on the mass 302 and the sensors 314, 316, 318, 320 may produce non-zero signals. For example in a rest state, with no pitch or roll applied to the joystick controller, the Z axis may be aligned with the vertical axis (as determined by the force of gravity). Gravity may displace the mass 302, from a position it would otherwise have assumed in the absence of gravity. As a result the displacement sensors may produce some non-zero signal $V_0$, which is referred to herein as a "zero-point" acceleration signal. The zero-point acceleration signal $V_0$ may be subtracted from the accelerometer signal V before analyzing the raw signals from the sensors 314, 316, 318, 320.

Figure 4:
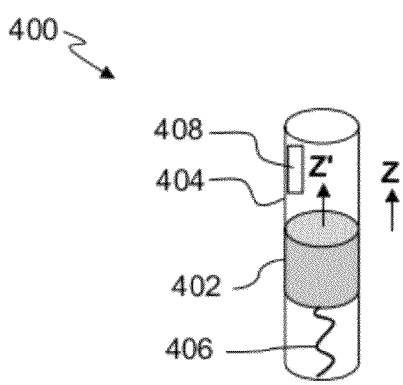
FIG. 4 is a three-dimensional schematic diagram illustrating correction of an orientation dependent zero-point accelerometer signal in accordance with an embodiment of the present invention.

If the frame 304 (and the controller 110) remains in the same orientation with respect to pitch and roll the zero-point acceleration signal $V_0$ is constant. However, the zero-point acceleration signal $V_0$ may be dependent on the amount of rotation about the pitch and roll axes. Embodiments of the present invention may take into account the effects of pitch and roll on the zero-point acceleration signal $V_0$. For example, FIG. 4 illustrates the situation with respect to a single axis accelerometer 400 having a mass 402 constrained to move in a tube 404 along a tube axis Z. A spring 406 connects the mass 404 to an end-cap of the tube 404. A sensor 408, e.g., a capacitance sensor as described above. If the tube axis Z is tilted (as shown in phantom) with respect to a vertical direction Z' by an angle θ due to pitch and roll of the tube 404, a "rotated" zero-point acceleration signal $V_0'$ may be expected to be related to $V_0$ and θ as:

$$V_0' = V_0 \cos\theta.$$

Note that in the extreme case of θ=90 degrees, $V_0'$=0.

The angle θ generally depends on the angles of pitch and roll. These may be determined from signals from separate sensors. A unit vector z directed along the tube axis Z may be constructed from known absolute values of pitch and roll relative to a known initial orientation, e.g., one in which the accelerometer axis is aligned with a unit vector z' directed along the vertical axis. It is noted that the initial orientation may be any orientation of the joystick controller that produces a stable signal from the accelerometer 400. A dot product between the unit vectors z and z' gives the cosine of the angle θ between them. This dot product may be multiplied by the zero-point signal $V_0$ to provide the desired correction factor, which may then be subtracted from the acceleration signal obtained from the sensor 408.

It is noted that in embodiments of the present sensor various types of inertial sensor devices may be used to provide information on 6-degrees of freedom (e.g., X, Y and Z translation and rotation about X, Y and Z axes). Examples of suitable inertial sensors for providing information on 6-degrees of freedom include accelerometers of the type shown in FIG. 3A, one or more single axis accelerometers, mechanical gyroscopes, ring laser gyroscopes or combinations of two or more of these.

Figure 5A:
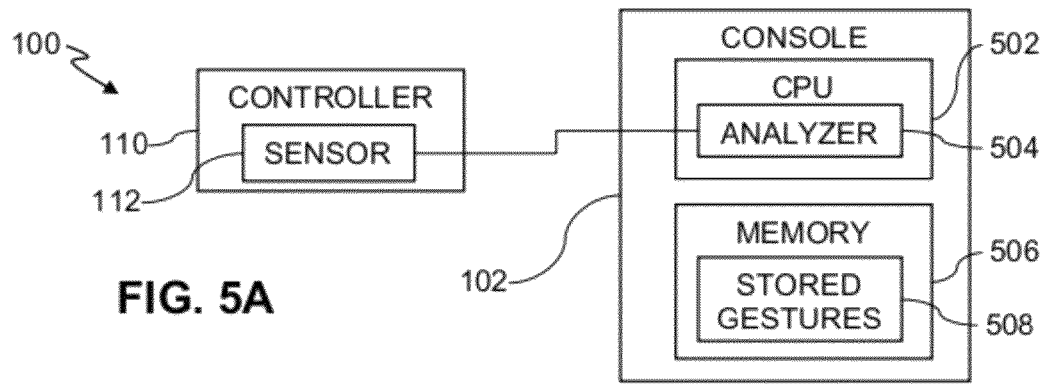
FIG. 5A is a block diagram of a portion of the video game system of FIG. 1.

Signals from the sensor may be analyzed to determine the motion and/or orientation of the controller during play of a video game according to an inventive method. Such a method may be implemented as a series of processor executable program code instructions stored in a processor readable storage medium and executed on a digital processor. For example, as depicted in FIG. 5A, the video game system 100 may include a processor 502 on the console 102. The processor 502 may be any suitable digital processor unit, e.g., a microprocessor of a type commonly used in video game consoles. The processor may implement an inertial analyzer 504 through execution of processor readable instructions. A portion of the instructions may be stored in a memory 506. Alternatively, the inertial analyzer 504 may be implemented in hardware, e.g., as an application specific integrated circuit (ASIC). Such analyzer hardware may be located on the controller 110 or on the console 102 or may be remotely located elsewhere. In hardware implementations, the analyzer 504 may be programmable in response to external signals e.g., from the processor 502 or some other remotely located source, e.g., connected by USB cable, wireless connection, or over a network.

The inertial analyzer 504 may include or implement instructions that analyze the signals generated by the inertial sensor 112 and utilize information regarding position and/or orientation of the controller 110. For example, as shown in the flow diagram 510 of FIG. 5B signals may be generated by the inertial sensor 112 as indicated at block 512. The inertial sensor signals may be analyzed to determine information regarding the position and/or orientation of the controller 110 as indicated at block 514. The position and or orientation information may be utilized during play of a video game with the system 100 as indicated at block 516.

In certain embodiments, the position and/or orientation information may be used in cataloging or recognition of gestures made by the user 108 during game play. As indicated in the flow diagram 520 of FIG. 5C, a path of the controller 110 may be tracked using the position and/or orientation information as indicated at block 522. By way of example, and without limitation, the path may include a set of points representing a position of the center of mass of the controller with respect to some system of coordinates. Each position point may be represented by one or more coordinates, e.g., X, Y and Z coordinates in a Cartesian coordinate system. A time may be associated with each point on the path so that both the shape of the path and the progress of the controller along the path may be monitored. In addition, each point in the set may have associated with it data representing an orientation of the controller, e.g., one or more angles of rotation of the controller about its center of mass. Furthermore, each point on the path may have associated with it values of velocity and acceleration of the center of mass of the controller and rates of angular rotation and angular acceleration of the controller about its center of mass.

As indicated at block 524, the tracked path may be compared to one or more stored paths corresponding to known and/or pre-recorded gestures 508 that are relevant to the context of the video game being played. The analyzer 504 may be configured to recognize a user or process audio authenticated gestures, etc. For example, a user may be identified by an the analyzer 504 through a gesture and that a gesture may be specific to a user. Such a specific gestures may be recorded and included among the pre-recorded gestures 508 stored in memory 506. The recordation process may optionally store audio generated during recordation of a gesture. The sensed environment is sampled into a multi-channel analyzer and processed. The processor may reference gesture models to determine and authenticate and/or identify a user or objects based on voice or acoustic patterns and to a high degree of accuracy and performance.

As indicated in FIG. 5A, the gestures may be stored in the memory 506. Examples of gestures include, but are not limited to throwing an object such as a ball, swinging an object such as a bat or golf club, pumping hand pump, opening or closing a door or window, turning steering wheel or other vehicle control, martial arts moves such as punches, sanding movements, wax on wax off, paint the house, shakes, rattles, rolls, football pitches, turning knob movements, 3D MOUSE movements, scrolling movements, movements with known profiles, any recordable movement, movements along any vector back and forth i.e. pump the tire but at some arbitrary orientation in space, movements along a path, movements having precise stop and start times, any time based user manipulation that can be recorded, tracked and repeated within the noise floor, splines, and the like. Each of these gestures may be pre-recorded from path data and stored as a time-based model. Comparison of the path and stored gestures may start with an assumption of a steady state if the path deviates from a steady state the path can be compared to the stored gestures by a process of elimination. If at block 526 there is no match, the analyzer 504 may continue tracking the path of the controller 110 at block 522. If there is a sufficient match between the path (or a portion thereof) and a stored gesture, a state of the system 100, e.g., the state of the game, may be changed as indicated at 528. Changes of state of the system or game may include, but are not limited to interrupts, sending control signals, changing variables, etc.

Here is one example of how this can occur. Upon determining that the controller 110 has left a steady state the path the analyzer 504 tracks movement of the controller 110. As long as the path of the controller 110 complies with a path defined in the stored gesture models 508, those gestures are possible "hits". If the path of the controller 110 deviates (within the noise tolerance setting) from any gesture model 508, that gesture model may be removed from the hit list. Each gesture reference model includes a time-base in which the gesture is recorded. The analyzer 502 compares the controller path data to the stored gestures 508 at the appropriate time index. Occurrence of a steady state condition may reset the clock. When deviating from steady state (i.e. when movements are tracked outside of the noise threshold) the hit list is populated with all potential gesture models. The clock is started and movements of the controller are compared against the hit list. Again, the comparison is a walk through time. If any gesture in the hit list reaches the end of the gesture then it is a hit.

In certain embodiments, the analyzer 504 may inform a game program when certain events occur. Examples of such events include the following:

INTERRUPT ZERO-ACCELERATION POINT REACHED (X AND/OR Y AND/OR Z AXIS). In certain game situations the analyzer 504 may notify or interrupt routine within the game program when acceleration of the controller changes at the inflection points. For example, the user 108 may use the controller 110 to control a game avatar representing a quarterback in a football simulation game. The analyzer 504 may track the controller (representing the football) via a path generated from signals from the inertial sensor 112. A particular change in acceleration of the controller 110 may signal release of the football. At this point, the analyzer may trigger another routine within the program (e.g., a physics simulation package) to simulate the trajectory of the football based on the position, and/or velocity and/or orientation of the controller at the point of release.

Interrupt New Gesture Recognized

In addition, the analyzer 504 may be configured by one or more inputs. Examples of such inputs include, but are not limited to:

SET NOISE LEVEL (X, Y or Z AXIS). The noise level may be a reference tolerance used when analyzing jitter of the user's hands in the game.

SET SAMPLING RATE. As used herein, the sampling rate may refer to how often the analyzer 502 samples the signals from the inertial sensor. The sampling rate may be set to oversample or average the signal.

SET GEARING. As used herein gearing generally refers to the ratio of controller movements to movements occurring within the game. Examples of such "gearing" in the context of control of a video game may be found in U.S. patent application Ser. No. 11/382,040, filed May 7, 2007, (now U.S. Pat. No. 7,391,409), which is incorporated herein by reference.

SET MAPPING CHAIN. As used herein, a mapping chain refers to a map of gesture models. The gesture model maps can be made for a specific input Channel (e.g., for path data generated from inertial sensor signals only) or for a hybrid Channel formed in a mixer unit. Three input Channels may be served by two or more different Analyzers that are similar to the inertial analyzer 504. Specifically, these may include: the inertial analyzer 504 as described herein, a video analyzer as described e.g., in U.S. patent application Ser. No. 11/382,034, entitled SCHEME FOR DETECTING AND TRACKING USER MANIPULATION OF A GAME CONTROLLER BODY (Published as U.S. Patent Application Publication 20060256081), which is incorporated herein by reference, and an Acoustic Analyzer, e.g., as described in U.S. patent application Ser. No. 11/381,721 (Published as U.S. Patent Application Publication 20060239471), which is incorporated herein by reference. The Analyzers can be configured with a mapping chain. Mapping chains can be swapped out by the game during gameplay as can settings to the Analyzer and to the Mixer.

Referring to again to FIG. 5A, block 502, those of skill in the art will recognize that there are numerous ways to generate signals from the inertial sensor 112. A few examples, among others have been described above with respect to FIGS. 3A-3E. Referring to block 504, there are numerous ways to analyze the sensor signals generated in block 502 to obtain information relating to the position and/or orientation of the controller 110. By way of example and without limitation the position and/or orientation information may include, but is not limited to information regarding the following parameters individually or in any combination:

CONTROLLER ORIENTATION. Orientation of the controller 110 may be expressed in terms of pitch, roll or yaw angle with respect to some reference orientation, e.g., in radians). Rates of change of controller orientation (e.g., angular velocities or angular accelerations) may also be included in the position and/or orientation information. Where the inertial sensor 112 includes a gyroscopic sensor controller orientation information may be obtained directly in the form of one or more output values that are proportional to angles of pitch, roll or yaw. CONTROLLER POSITION (e.g., Cartesian coordinates X, Y, Z of the controller 110 in some frame of reference)

CONTROLLER X-AXIS VELOCITY, e.g., the rate of change of position of the controller 110 along the X-axis with respect to time;

CONTROLLER Y-AXIS VELOCITY, e.g., the rate of change of position of the controller 110 along the Y-axis with respect to time;

CONTROLLER Z-AXIS VELOCITY, e.g., the rate of change of position of the controller 110 along the Z-axis with respect to time;

CONTROLLER X-AXIS ACCELERATION, e.g., the rate of change of X-AXIS VELOCITY with respect to time;

CONTROLLER Y-AXIS ACCELERATION, e.g., the rate of change of Y-AXIS VELOCITY with respect to time;

CONTROLLER Z-AXIS ACCELERATION, e.g., the rate of change of Z-AXIS VELOCITY with respect to time;

It is noted that with respect to position, velocity and acceleration the position and/or orientation information may be expressed in terms of coordinate systems other than Cartesian. For example, cylindrical or spherical coordinates may be used for position, velocity and acceleration. Acceleration information with respect to the X, Y and Z axes may be obtained directly from an accelerometer type sensor, e.g., as described above with respect to FIGS. 3A-3E. The X, Y and Z accelerations may be integrated with respect to time from some initial instant to determine changes in X, Y and Z velocities. These velocities may be computed by adding the velocity changes to known values of the X-, Y-, and Z-velocities at the initial instant in time. The X, Y and Z velocities may be integrated with respect to time to determine X-, Y-, and Z-displacements of the controller. The X-, Y-, and Z-positions may be determined by adding the displacements to known X-, Y-, and Z-, positions at the initial instant.

STEADY STATE Y/N—This particular information indicates whether the controller is in a steady state, which may be defined as any position, which may be subject to change too. In a preferred embodiment the steady state position may be one wherein the controller is held in a more or less level orientation at a height roughly even with a user's waist.

TIME SINCE LAST STEADY STATE generally refers to data related to how long a period of time has passed since a steady state (as referenced above) was last detected. That determination of time may, as previously noted, be calculated in real-time, processor cycles, or sampling periods. The Time Since Last Steady State data time may be important with regard to resetting tracking of a controller with regard to an initial point to ensure accuracy of character or object mapping in a game environment. This data may also be important with regard to determining available actions/gestures that might be subsequently executed in a game environment (both exclusively and inclusively).

LAST GESTURE RECOGNIZED generally refers to the last gesture recognized either by a gesture recognition engine (which may be implemented in hardware or software. The identification of a last gesture recognized may be important with respect to the fact that a previous gesture may be related to the possible gestures that may be subsequently recognized or some other action that takes place in the game environment.

Time Last Gesture Recognized

The above outputs may be sampled at any time by a suitably configured game program or simulation software.

According to a preferred embodiment of the invention, gestures made with the controller 110 may be catalogued and/or recognized according to an inventive method. FIG. 5D is a flow diagram illustrating an example of a method 530 for detecting a Gesture and preparing it for Cataloging or Recognition. As shown in FIG. 5D, input data from a sensor, e.g., the inertial sensor 112, the video capturing device 114, or the image microphone array 118 (or some combination of two or more of these) may be low-pass filtered as indicated in 532. In particular, the input data may be low-pass filtered with a cut-off at about 50% of the Nyquist frequency. At 534, an energy E of the controller 110 may be calculated as follows:

$$E = (1 - \Delta t) E_0 + \Delta t \cdot Dot(S-B, S-B)$$

where S is a current sample vector and B is a baseline vector;
$\Delta t$ is the difference between a time stamp on the current frame and a time stamp on the previous frame;
$E_0$ is the energy from the last frame; and
$Dot(S-B, S-B)$ is a dot product between the vector difference $S-B$ and itself.

By way of example and without loss of generality, the components of the sample vector S and the baseline vector B may include X, Y and Z components of the motion of the controller 110 as well as an amount of yaw (rotation about the Z-axis). In addition, the components of the sample vector S and baseline vector B may include X, Y, Z and yaw components of a gravity vector. The gravity vector may indicate a direction of the force of gravity with respect to a reference frame of the controller 110. The X, Y, Z and yaw components of the sample vector S and baseline vector B may be position, velocity or acceleration values of the controller 110. These values may be derived from signals generated, e.g., by the inertial sensor 112, the image sensor 114, the microphone array 118 or some combination of two or more of these.

A calm energy threshold may be adjusted through trial and error. If the energy of the controller 110 is less than some predefined calm energy threshold then the baseline vector value may be updated, as indicated at 536 and 538. In particular, the value of the baseline vector B may be updated to a new value according to:

$$B = (1 - \alpha) \cdot B_0 + \alpha * S$$

where $B_0$ represents the baseline vector from the previous frame and $\alpha$ is a tuning parameter which may be a constant or variable. The tuning parameter $\alpha$ may be varied so that the baseline is got back quicker if recognition of a gesture is end.

The sample vector S may then be adjusted to account for the new baseline as indicated in 540. In particular the new value of the sample vector S may be given by $$S = S - B$$

Updating the baseline value takes into account changes in orientation of the controller 110 as the user 108 changes his rest position, e.g., as a result of sitting down and leaning back in a chair.

A local variance (LV) of the input data is calculated over a predefined number of variance samples (VS) as indicated in 542.

$$LV=(VS \cdot \Sigma S^2+(\Sigma S)^2)/VS^2$$

The local variance LV may be a variance taken over a sliding window of, for example, 5 samples. The local variance may be used to start and stop gesture recording. For example, if the average local variance scalar value is greater than a predefined Gesture Threshold value then recording samples as a Gesture may begin as indicated in 544. Once the average local variance LV drops below the Gesture Threshold recording of the samples is stopped as indicated in 546. In some embodiments, different Gesture thresholds may be used for starting and stopping recording.

After recording stops a recorded gestures total variance TV may be calculated over the number of samples (GS) in the gesture as indicated in 548. In particular, the total variance TV may be calculated according to:

$$TV=(GS \cdot \Sigma S^2+(\Sigma S)^2)/GS^2$$

In the above equation, the sums are taken over the samples GS in the gesture. In general, each sample S may be made up of two or more components, e.g., one component for each degree of freedom of motion of the controller. The total variance TV may be broken down into a set of separate variance components, one for variance component for each component of the samples S. The scalar components of the total variance TV may be ranked so that axes of pad are ordered from most motion to least motion as indicated in 550. Such ranking may be different at different periods of time during a gesture.

Once a gesture has been recorded, it may be catalogued and used for comparison against other gestures as indicated at 552. Alternatively, a recorded gesture may be compared against a catalog of stored gestures for gesture recognition as indicated in 554. One example of gesture recognition is described below with respect to FIG. 5E.

Figure 5B:
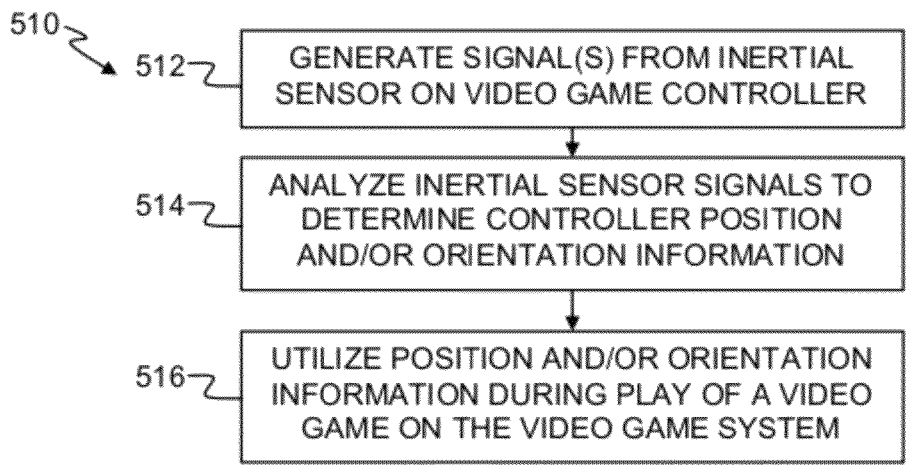
FIG. 5B is a flow diagram of a method for tracking a controller of a video game system according to an embodiment of the present invention.
Figure 5C:
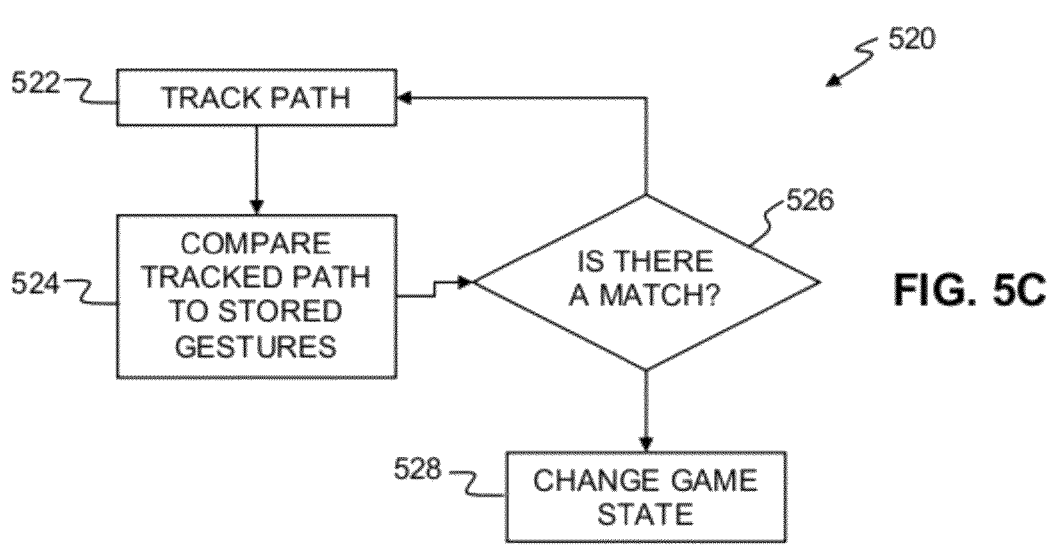
FIG. 5C is a flow diagram illustrating a method for utilizing position and/or orientation information during game play on a video game system according to an embodiment of the present invention.
Figure 5D:
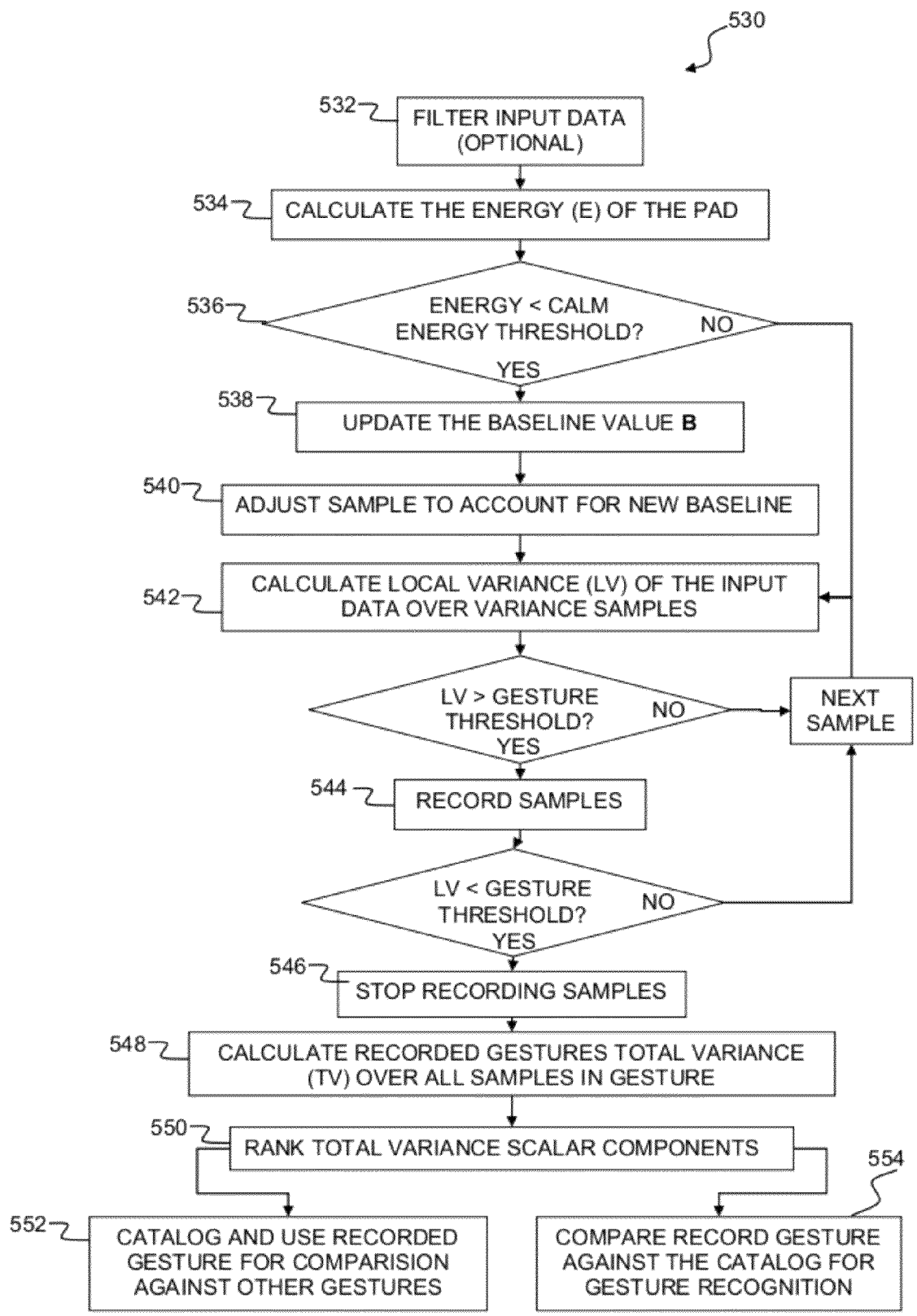
FIG. 5D is a flow diagram illustrating a method for detecting a gesture and preparing according to an embodiment of the present invention.
Figure 5E:
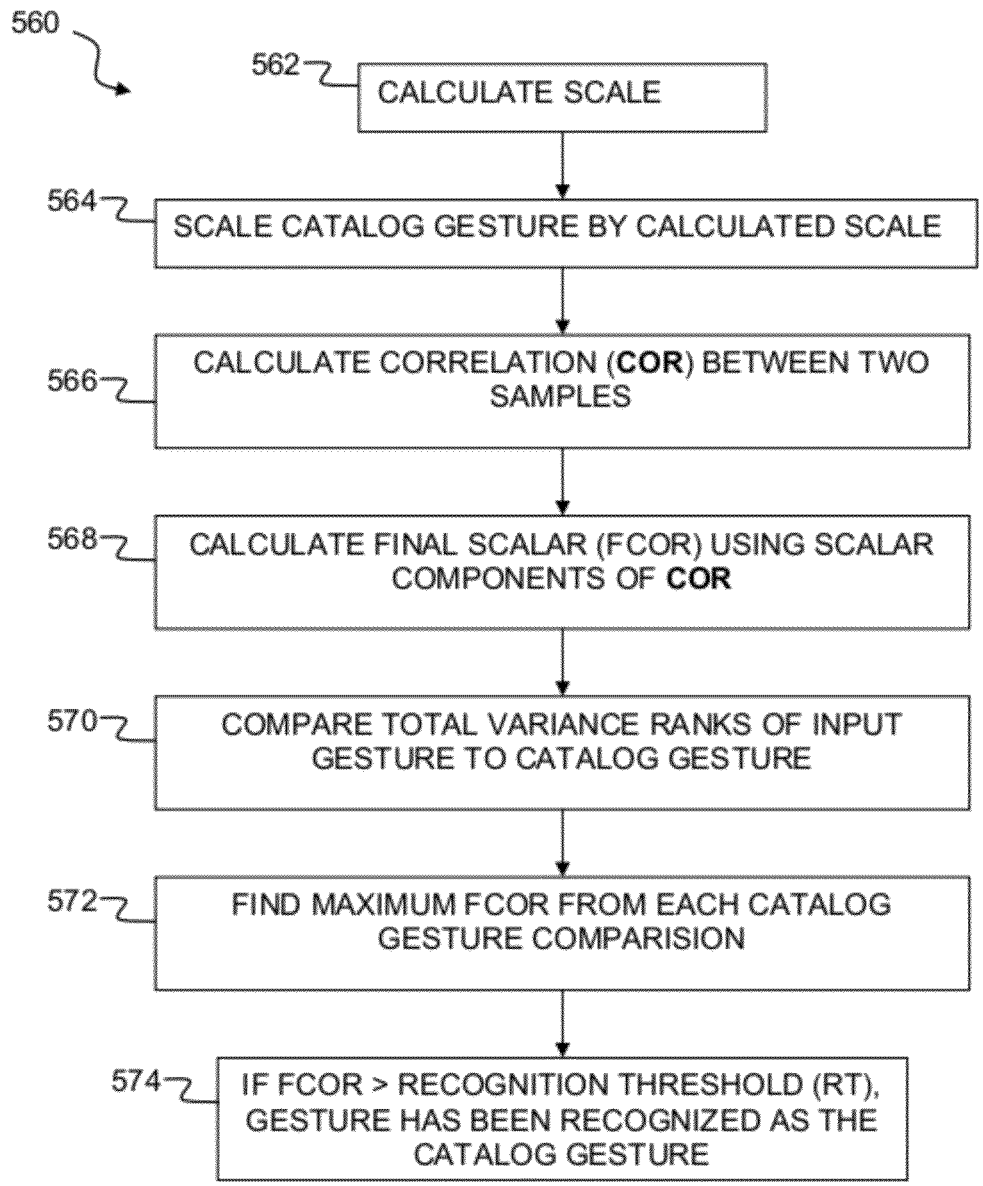
FIG. 5E is a flow diagram illustrating a method for gesture recognition according to an embodiment of the present invention.

FIG. 5E is a flow diagram illustrating a method 560 for gesture recognition according to an embodiment of the present invention. An Input Gesture IG may be compared to each of one or more Catalogue Gestures CG in a gesture catalog. Alternatively, the input gesture IG may be compared only against a predetermined subset of the Catalogue Gestures CG in the gesture catalog. The subset of Catalogue Gestures CG may be dictated by game logic. In some embodiments, an overlap between a user created gesture and cataloged gesture may be determined to flag gestures that are too close to each other. Flagging such gestures may avoid mistaking one gesture for another.

As shown in FIG. 5E, a scale (S) may be calculated as indicated in 562:

$$S=CG_{sc}/IG_{sc}.$$

where $CG_{sc}$ indicates a sample count in a Catalogue Gesture and $IG_{sc}$ indicates a sample count for the Input Gesture IG.

The scale may be used to eliminate catalogue gestures that are significantly longer or significantly shorter than the Input Gesture IG. For example, if the scale S is less than a low-end threshold (e.g. about 0.5) or greater than a high-end threshold (e.g., about 1.5) for a particular catalog gesture CG, this Catalog Gesture may be skipped and gesture recognition may proceed to the next catalogue gesture.

The Catalog Gesture CG may be scaled by the Scale S calculated above, e.g., by linear interpolation, as indicated in 564. The scale S may be adjusted based on CG and IG depending on which has more samples. For example, the shorter of CG and IG, i.e., the one with fewer samples, may be scaled up.

A correlation (COR) between the Input Gesture IG and the Catalogue Gesture CG may then be calculated as indicated in 566. By way of example, the correlation COR may be calculated as $$COR=COV(CG,IG)/(\sigma_{cg} \cdot \sigma_{ig})$$

where $\sigma_{cg}$ indicates a vector standard deviation for the samples in the Catalogue Gesture CG and $\sigma_{ig}$ indicates a vector standard deviation for the samples in the input gesture IG. Furthermore, COV(CG, IG) represents the covariance of the Catalogue Gesture CG and Input Gesture IG, e.g., given by:

$$COV(CG,IG)=(1/sc) \cdot \Sigma(CG_i-\mu_{cg}) \cdot (IG_i-\mu_{ig})$$

where $\mu_{cg}$ is the mean value of the samples in the Catalogue Gesture and $\mu_{ig}$ is the mean value of the samples in the Input Gesture. The sum is taken over all samples in the Input Gesture IG.

The scalar values in the correlation COR may be used as an input to calculate a final scalar correlation FCOR as indicated at 568. The FCOR is calculated using a weighted average of the components of COR. By way of example, weights of 0, 0.5, 0.25, 0.025 may be applied respectively to the X, Y, Z, and yaw components of COR, with the weights corresponding to the Total Variance ranks calculated above. Weights associated with each rank may change over time during the input gesture IG.

The total variance ranks of the Input Gesture IG may be compared to the total variance ranks for the Catalog Gesture as indicated at 570. For each variance rank that is different a penalty may be applied to FCOR.

A maximum value of FCOR may be determined from each Catalog Gesture comparison as indicated in 572. If the maximum FCOR is greater than some predefined Recognition Threshold RT then the gesture has been recognized as the catalog gesture corresponding to the FCOR as indicated in 574.

Figure 6:
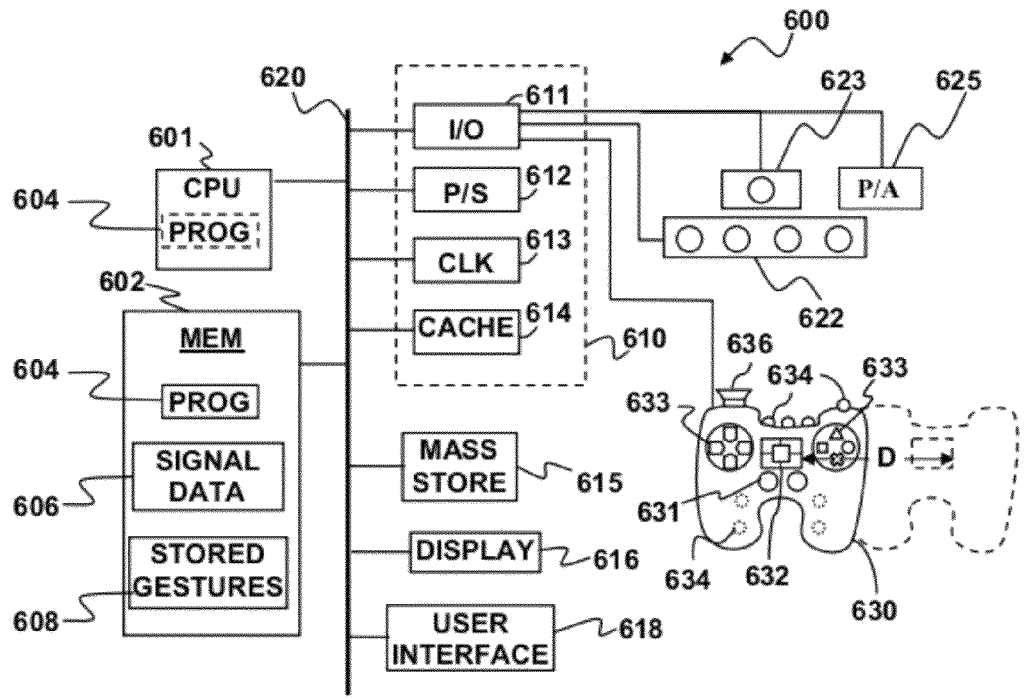
FIG. 6 is a block diagram illustrating a video game system according to an embodiment of the present invention.

According to embodiments of the present invention, a gesture recognition method of the type described above may be implemented in a video game system as depicted in FIG. 6. Specifically, a video game system 600 may include a processor 601 and a non-transitory computer-readable storage medium, such as a memory 602 (e.g., RAM, DRAM, ROM, and the like). In some embodiments, the video game system 600 may include multiple processors 601 if parallel processing is to be implemented. The memory 602 may include data and a program code 604, which may include portions that are configured as described above. Specifically, the memory 602 may include inertial signal data 606 which may include stored controller path information as described above. The memory 602 may also contain stored gesture data 608, e.g., data representing one or more gestures relevant to the game program 604. The program code 604 may include instructions for implementing gesture detection, e.g., as described above with respect to FIG. 5D, and/or gesture recognition, e.g., as described above with respect to FIG. 5E.

The system 600 may also include well-known support functions 610, such as input/output (I/O) elements 611, power supplies (P/S) 612, a clock (CLK) 613 and cache 614. The apparatus 600 may optionally include a mass storage device 615 such as a disk drive, CD-ROM drive, tape drive, or the like to store programs and/or data. The controller may also optionally include a display unit 616 and user interface unit 618 to facilitate interaction between the controller 600 and a user. The display unit 616 may be in the form of a cathode ray tube (CRT) or flat panel screen that displays text, numerals, graphical symbols or images. The user interface 618 may include a keyboard, mouse, joystick, light pen or other device. In addition, the user interface 618 may include a microphone, video camera or other signal transducing device to provide for direct capture of a signal to be analyzed. The processor 601, memory 602 and other components of the system 600 may exchange signals (e.g., code instructions and data) with each other via a system bus 620 as shown in FIG. 6.

A microphone array 622 may be coupled to the system 600 through the I/O functions 611. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 622 are omni-directional microphones. An optional image capture unit 623 (e.g., a digital camera) may be coupled to the apparatus 600 through the I/O functions 611. One or more pointing actuators 625 that are mechanically coupled to the camera may exchange signals with the processor 601 via the I/O functions 611.

As used herein, the term I/O generally refers to any program, operation or device that transfers data to or from the system 600 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the apparatus 600 may be a video game unit, which may include a controller 630 coupled to the processor via the I/O functions 611 either through wires (e.g., a USB cable) or wirelessly. In some embodiments the joystick controller 630 may be mountable to a user's body. The controller 630 may have analog joystick controls 631 and conventional buttons 633 that provide control signals commonly used during playing of video games. Such video games may be implemented as processor readable data and/or instructions from the program 604 which may be stored in the memory 602 or other processor readable medium such as one associated with the mass storage device 615.

The joystick controls 631 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

In addition to conventional features, the controller 630 may include one or more inertial sensors 632, as described above. The inertial sensors 632 may provide position and/or orientation information to the processor 601 via an inertial signal. Orientation information may include angular information such as a tilt, roll or yaw of the controller 630. By way of example, the inertial sensors 632 may include any number and/or combination of accelerometers, gyroscopes or tilt sensors. In a preferred embodiment, the inertial sensors 632 include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller 630. Such techniques may be implemented by instructions from the game program 604 which may be stored in the memory 602 and executed by the processor 601.

By way of example an accelerometer suitable as the inertial sensor 632 may be a simple mass elastically coupled at three or four points to a frame, e.g., by springs. Pitch and roll axes lie in a plane that intersects the frame, which is mounted to the joystick controller 630. As the frame (and the joystick controller 630) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like. In some embodiments, the inertial sensor 632 may be removably mounted to a "body" of the joystick controller 630. A removable inertial sensor may exchange signals with electronic components of the controller 630, e.g., via a Universal Serial Bus (USB) connection. The removable inertial sensor may be mechanically coupled to the body of the joystick controller through any of a number of different connections.

In addition, the joystick controller 630 may include one or more light sources 634, such as light emitting diodes (LEDs). The light sources 634 may be used to distinguish one controller from the other. For example one or more LEDs can accomplish this by flashing or holding an LED pattern code. By way of example, 5 LEDs can be provided on the joystick controller 630 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by the image capture unit 623. Furthermore, the LED pattern codes may also be used to determine the positioning of the joystick controller 630 during game play. For instance, the LEDs can assist in identifying tilt, yaw and roll of the controllers. This detection pattern can assist in providing a better user/feel in games, such as aircraft flying games, etc. The image capture unit 623 may capture images containing the joystick controller 630 and light sources 634. Analysis of such images can determine the location and/or orientation of the joystick controller. Such analysis may be implemented by program code instructions 604 stored in the memory 602 and executed by the processor 601. To facilitate capture of images of the light sources 634 by the image capture unit 623, the light sources 634 may be placed on two or more different sides of the joystick controller 630, e.g., on the front and on the back (as shown in phantom). Such placement allows the image capture unit 623 to obtain images of the light sources 634 for different orientations of the joystick controller 630 depending on how the joystick controller 630 is held by a user.

In addition the light sources 634 may provide telemetry signals to the processor 601, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 601 may decode the telemetry signal from the optical signal and execute a game command in response to the decoded telemetry signal. Telemetry signals may be decoded from analysis of images of the joystick controller 630 obtained by the image capture unit 623. Alternatively, the processor 601 may include a separate optical sensor dedicated to receiving telemetry signals from the lights sources 634. The use of LEDs in conjunction with determining an intensity amount in interfacing with a computer program is described, e.g., in U.S. patent application Ser. No. 11/429,414, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM" (Now U.S. Pat. No. 7,627,139), which is incorporated herein by reference in its entirety. In addition, analysis of images containing the light sources 634 may be used for both telemetry and determining the position and/or orientation of the joystick controller 630. Such techniques may be implemented by instructions of the program 604 which may be stored in the memory 602 and executed by the processor 601.

The processor 601 may use the inertial signals from the inertial sensor 632 in conjunction with optical signals from light sources 634 detected by the image capture unit 623 and/or sound source location and characterization information from acoustic signals detected by the microphone array 622 to deduce information on the location and/or orientation of the controller 630 and/or its user in conjunction with gesture detection and recognition as described herein. For example, "acoustic radar" sound source location and characterization may be used in conjunction with the microphone array 622 to track a moving voice while motion of the joystick controller is independently tracked (through the inertial sensor 632 and or light sources 634). In acoustic radar a pre-calibrated listening zone may be selected at runtime. Sounds originating from sources outside the pre-calibrated listening zone may be filtered out. The pre-calibrated listening zones may include a listening zone that corresponds to a volume of focus or field of view of the image capture unit 623. Examples of acoustic radar are described in detail in U.S. patent application Ser. No. 11/381,724, (now U.S. Pat. No. 8,073,157), which is incorporated herein by reference. Any number of different combinations of different modes of providing control signals to the processor 601 may be used in conjunction with embodiments of the present invention. Such techniques may be implemented by program code instructions 604 which may be stored in the memory 602 and executed by the processor 601 and may optionally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 623.

The program 604 may optionally include one or more instructions that direct the one or more processors to produce a discrete time domain input signal $x_m(t)$ from microphones $M_0 \ldots M_M$, of the microphone array 622, determine a listening sector, and use the listening sector in a semi-blind source separation to select the finite impulse response filter coefficients to separate out different sound sources from input signal $x_m(t)$. The program 604 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal $y(t)$ from the microphone array. The fractional delays may be selected to such that a signal from the reference microphone $M_0$ is first in time relative to signals from the other microphone(s) of the array. The program 604 may also include instructions to introduce a fractional time delay $\Delta$ into an output signal $y(t)$ of the microphone array so that: $y(t+\Delta) = x(t+\Delta)*b_0 + x(t-1+\Delta)*b_1 + x(t-2+\Delta)*b_2 + \ldots + x(t-N+\Delta)b_N$, where $\Delta$ is between zero and $\pm 1$. Examples of such techniques are described in detail in U.S. patent application Ser. No. 11/381,729, to Xiadong Mao, entitled "ULTRA SMALL MICROPHONE ARRAY" filed May 4, 2006, (now U.S. Pat. No. 7,809,145) the entire disclosures of which are incorporated by reference.

In addition, a sound emitter 636, e.g., a speaker, a buzzer, a horn or a pipe, may be mounted to the joystick controller 630. In certain embodiments the sound emitter may be detachably mounted to a "body" of the joystick controller 630. In "acoustic radar" embodiments wherein the program code 604 locates and characterizes sounds detected with the microphone array 622, the sound emitter 636 may provide an audio signal that can be detected by the microphone array 622 and used by the program code 604 to track the position of the game controller 630. The sound emitter 636 may also be used to provide an additional "input channel" from the game controller 630 to the processor 601. Audio signals from the sound emitter 636 may be periodically pulsed to provide a beacon for the acoustic radar to track location. The audio signals (pulsed or otherwise) may be audible or ultrasonic. The acoustic radar may track the user manipulation of the game controller 630 and where such manipulation tracking may include information about the position and orientation (e.g., pitch, roll or yaw angle) of the game controller 630. The pulses may be triggered at an appropriate duty cycle as one skilled in the art is capable of applying. Pulses may be initiated based on a control signal arbitrated from the system. The system 600 (through the program code 604) may coordinate the dispatch of control signals amongst two or more joystick controllers 630 coupled to the processor 601 to assure that multiple controllers can be tracked.

The program 604 may include one or more instructions which, when executed, cause the system 600 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array 622 and the attenuation to an optimum value. The instructions may, when executed, cause the apparatus 600 to determine a value of an attenuation of the input signals for one or more sectors and select a sector for which the attenuation is closest to an optimum value. Examples of such a technique are described, e.g., in U.S. patent application Ser. No. 11/381,725, to Xiadong Mao, entitled "METHODS AND APPARATUS FOR TARGETED SOUND DETECTION" filed May 4, 2006, (now U.S. Pat. No. 7,783,061) the disclosures of which are incorporated herein by reference.

Signals from the inertial sensor 632 may provide part of a tracking information input and signals generated from the image capture unit 623 from tracking the one or more light sources 634 may provide another part of the tracking information input. By way of example, and without limitation, such "mixed mode" signals may be used in a football type video game in which a Quarterback pitches the ball to the right after a head fake head movement to the left. Specifically, a game player holding the controller 630 may turn his head to the left and make a sound while making a pitch movement swinging the controller out to the right like it was the football. The microphone array 620 in conjunction with "acoustic radar" program code can track the user's voice. The image capture unit 623 can track the motion of the user's head or track other commands that do not require sound or use of the controller. The sensor 632 may track the motion of the joystick controller (representing the football). The image capture unit 623 may also track the light sources 634 on the controller 630. The user may release of the "ball" upon reaching a certain amount and/or direction of acceleration of the joystick controller 630 or upon a key command triggered by pressing a button on the controller 630.

In certain embodiments of the present invention, an inertial signal, e.g., from an accelerometer or gyroscope may be used to determine a location of the controller 630. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit 623 and light sources 634 the inertial sensor 632 may be subject to a type of error known as "drift" in which errors that accumulate over time can lead to a discrepancy D between the position of the joystick 630 calculated from the inertial signal (shown in phantom) and the actual position of the joystick controller 630. Embodiments of the present invention allow a number of ways to deal with such errors.

For example, the drift may be cancelled out manually by re-setting the initial position of the controller 630 to be equal to the current calculated position. A user may use one or more of the buttons on the controller 630 to trigger a command to re-set the initial position. Alternatively, image-based drift may be implemented by re-setting the current position to a position determined from an image obtained from the image capture unit 623 as a reference. Such image-based drift compensation may be implemented manually, e.g., when the user triggers one or more of the buttons on the joystick controller 630. Alternatively, image-based drift compensation may be implemented automatically, e.g., at regular intervals of time or in response to game play. Such techniques may be implemented by program code instructions 604 which may be stored in the memory 602 and executed by the processor 601.

In certain embodiments it may be desirable to compensate for spurious data in the inertial sensor signal. For example the signal from the inertial sensor 632 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by instructions of the program 604 which may be stored in the memory 602 and executed by the processor 601.

The processor 601 may perform analysis of inertial signal data 606 as described above in response to the data 606 and program code instructions of a program 604 stored and retrieved by the memory 602 and executed by the processor module 601. Code portions of the program 604 may conform to any one of a number of different programming languages such as Assembly, C++, JAVA or a number of other languages. The processor module 601 forms a general-purpose computer that becomes a specific purpose computer when executing programs such as the program code 604. Although the program code 604 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 604 may include a set of processor readable instructions that implement a method having features in common with the method 510 of FIG. 5B and the method 520 of FIG. 5C or some combination of two or more of these. The program code 604 may generally include one or more instructions that direct the one or more processors to analyze signals from the inertial sensor 632 to generate position and/or orientation information and utilize the information during play of a video game.

The program code 604 may optionally include processor executable instructions including one or more instructions which, when executed cause the image capture unit 623 to monitor a field of view in front of the image capture unit 623, identify one or more of the light sources 634 within the field of view, detect a change in light emitted from the light source(s) 634; and in response to detecting the change, triggering an input command to the processor 601. The use of LEDs in conjunction with an image capture device to trigger actions in a game controller is described e.g., in U.S. patent application Ser. No. 10/759,782 to Richard L. Marks, filed Jan. 16, 2004 and entitled: METHOD AND APPARATUS FOR LIGHT INPUT DEVICE (now U.S. Pat. No. 7,623,115), which is incorporated herein by reference in its entirety.

The program code 604 may optionally include processor executable instructions including one or more instructions which, when executed, use signals from the inertial sensor and signals generated from the image capture unit from tracking the one or more light sources as inputs to a game system, e.g., as described above. The program code 604 may optionally include processor executable instructions including one or more instructions which, when executed compensate for drift in the inertial sensor 632.

Although embodiments of the present invention are described in terms of examples related to a video game controller 630, embodiments of the invention, including the system 600 may be used on any user manipulated body, molded object, knob, structure, etc, with inertial sensing capability and inertial sensor signal transmission capability, wireless or otherwise.

Figure 7:
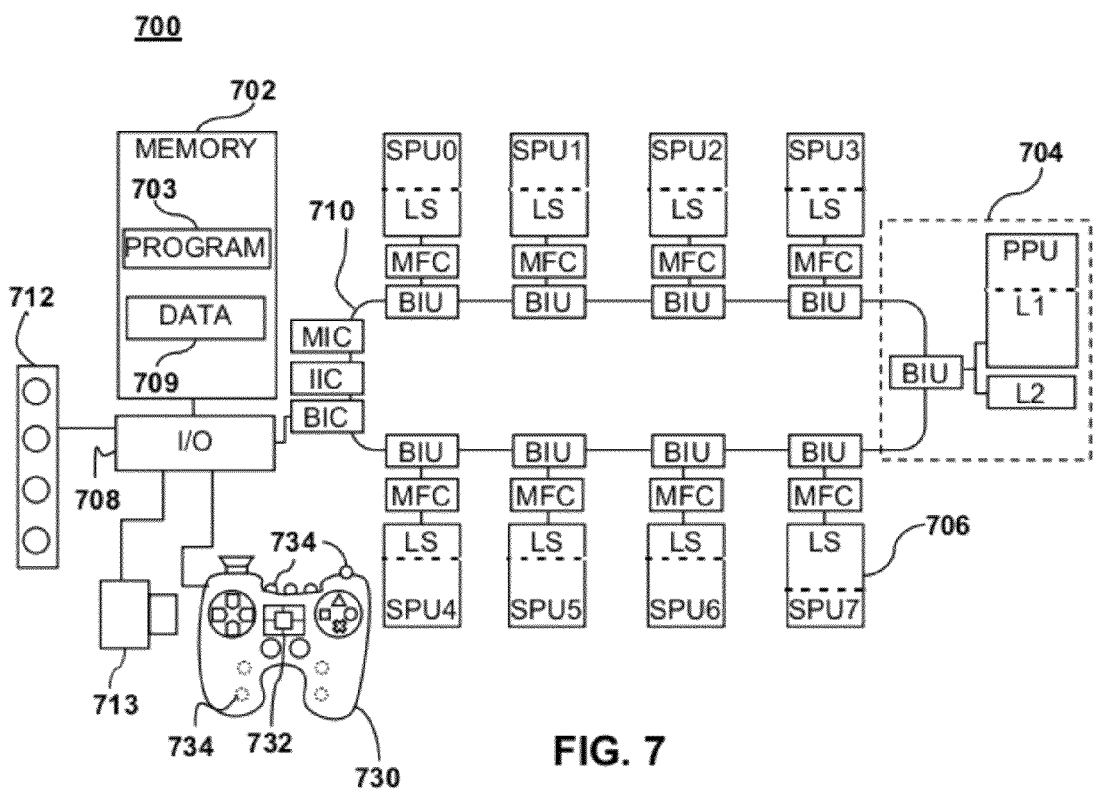
FIG. 7 is a block diagram of a cell processor implementation of the video game system according to an embodiment of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 7 illustrates a type of cell processor 700 according to an embodiment of the present invention. The cell processor 700 may be used as the processor 601 of FIG. 6 or the processor 502 of FIG. 5A. In the example depicted in FIG. 7, the cell processor 700 includes a main memory 702, power processor element (PPE) 704, and a number of synergistic processor elements (SPEs) 706. In the example depicted in FIG. 7, the cell processor 700 includes a single PPE 704 and eight SPE 706. In such a configuration, seven of the SPE 706 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 7.

The main memory 702 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a program 703, e.g., a video game program, may be resident in main memory 702. The program 703 may include an analyzer configured as described with respect to FIG. 5A, 5B or 5C above or some combination of these. In addition, the program 703 may include instructions to implement gesture detection, e.g., as set forth above with respect to FIG. 5D, and/or gesture recognition, e.g., as set forth above with respect to FIG. 5E. The program 703 may run on the PPE. The program 703 may be divided up into multiple signal processing tasks that can be executed on the SPEs and/or PPE.

By way of example, the PPE 704 may be a 64-bit PowerPC Processor Unit (PPU) with associated caches L1 and L2. The PPE 704 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 704 is the management and allocation of tasks for the SPEs 706 in the cell processor 700.

Although only a single PPE is shown in FIG. 7, some cell processor implementations, such as cell broadband engine architecture (CBEA), the cell processor 700 may have multiple PPEs organized into PPE groups, of which there may be more than one. These PPE groups may share access to the main memory 702. Furthermore the cell processor 700 may include two or more groups SPEs. The SPE groups may also share access to the main memory 702. Such configurations are within the scope of the present invention.

Each SPE 706 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in the system 700 may be performed by issuing direct memory access (DMA) commands from the memory flow controller (MFC) to transfer data to or from the local storage domain (of the individual SPE). The SPUs are less complex computational units than the PPE 704 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 704 allow for cost-effective processing over a wide range of applications.

Each SPE 706 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 706 and/or between the SPEs 706 and the PPE 704, the SPEs 706 and PPE 704 may include signal notification registers that are tied to signaling events. The PPE 704 and SPEs 706 may be coupled by a star topology in which the PPE 704 acts as a router to transmit messages to the SPEs 706. Alternatively, each SPE 706 and the PPE 704 may have a one-way signal notification register referred to as a mailbox. The mailbox can be used by an SPE 706 to host operating system (OS) synchronization.

The cell processor 700 may include an input/output (I/O) function 708 through which the cell processor 700 may interface with peripheral devices, such as a microphone array 712 and optional image capture unit 713 and a game controller 730. The game controller unit may include an inertial sensor 732, and light sources 734. In addition an Element Interconnect Bus 710 may connect the various components listed above. Each SPE and the PPE can access the bus 710 through a bus interface units BIU. The cell processor 700 may also includes two controllers typically found in a processor: a Memory Interface Controller MIC that controls the flow of data between the bus 710 and the main memory 702, and a Bus Interface Controller BIC, which controls the flow of data between the I/O 708 and the bus 710. Although the requirements for the MIC, BIC, BIUs and bus 710 may vary widely for different implementations, those of skill in the art will be familiar their functions and circuits for implementing them.

The cell processor 700 may also include an internal interrupt controller IIC. The IIC component manages the priority of the interrupts presented to the PPE. The IIC allows interrupts from the other components the cell processor 700 to be handled without using a main system interrupt controller. The IIC may be regarded as a second level controller. The main system interrupt controller may handle interrupts originating external to the cell processor.

In embodiments of the present invention, certain computations, such as the fractional delays described above, may be performed in parallel using the PPE 704 and/or one or more of the SPE 706. Each fractional delay calculation may be run as one or more separate tasks that different SPE 706 may take as they become available.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for gesture recognition, comprising:
a) receiving sample motion data from one or more sensors;
b) calculating a local variance of the sample motion data over a predetermined number of local variance samples;
c) beginning recording one or more values of the sample motion data for a gesture if the local variance scalar value is greater than a threshold for beginning recording;
d) calculating an average local variance scalar value using the one or more values of the sample motion data for a gesture; and
e) stopping the recording of the one or more values of the sample motion data for a gesture if the local variance scalar value is less than a threshold for stopping recording.

2. The method of claim 1, further comprising:
f) calculating a figure of merit using the sample values in the gesture and sample values in one or more catalog gesture, wherein the figure of merit is a measure of how well the gesture matched the catalog gesture;
g) determining whether an input gesture matches one of the one or more catalog gesture based on the figure of merit; and
h) taking action if the input gesture matches the one of the one or more catalog gesture.

3. The method of claim 2, wherein the sample motion data comprises vector components.

4. The method of claim 2, wherein the method is applied to a video game.

5. The method of claim 4, wherein taking action comprises responding to command associated with the gesture.

6. The method of claim 5, wherein comparing input gesture to selected subject of catalog gesture based on the game logic.

7. The method of claim 3, wherein the figure of merit is calculated with ranks assigned to components of a total variance corresponding to different ones of the vector components.

8. The method of claim 7, wherein j) includes comparing input gesture component ranks to catalog gesture component ranks.

9. The method of claim 8, wherein j) includes weighting components by ranking of total variance components.

10. The method of claim 9, wherein j) includes calculating a correlation between the input gesture and the catalog gesture.

11. The method of claim 9, further comprising scaling up the input gesture or catalog gesture based on which has fewer samples.

12. The method of claim 9, further comprising comparing total variance rankings for input gesture and catalog gesture and applying a penalty for each of input gesture rank that does not match.

13. The method of claim 12, wherein the figure of merit comprise a correlation scalar calculated as weighted average of scalar correlation with weights based on the total variance rankings.

14. The method of claim 13, wherein total variance rankings are calculated at different time intervals within the gesture.

15. The method of claim 14, wherein weights may be different at different intervals of tine within the gesture.

16. The method of claim 1, wherein the sample motion data includes data derived from a signal from an inertial sensor.

17. The method of claim 1, wherein the sample motion data includes data from an image from an image capturing device.

18. The method of claim 1, wherein the sample motion data includes data derived from one or more signals obtained from one or more acoustic sensors.

19. An apparatus for gesture recognition comprising:
a control device;
a processor operable to execute a program of a method for gesture recognition, wherein the method comprising:
receiving sample motion data from one or more sensors;
calculating a local variance of the sample motion data over a predetermined number of local variance samples;
beginning recording one or more values of the sample motion data for a gesture if the local variance scalar value is greater than a start threshold;
calculating an average local variance scalar value using the one or more values of the sample motion data for a gesture; and
stopping the recording of the one or more values of the sample motion data for a gesture if the local variance scalar value is less than a stop threshold.

20. The apparatus of claim 19, wherein the method for gesture recognition further comprises:
calculating a figure of merit using the sample values in the gesture and sample values in one or more catalog gesture, wherein the figure of merit is a measure of how well the gesture matched the catalog gesture;
determining whether an input gesture matches one of the one or more catalog gesture based on the figure of merit; and
taking action if the input gesture matches the one of the one or more catalog gesture.

21. A non-transitory computer readable storage medium having computer readable instructions embodied therein, the computer readable instructions being configured to implement, when executed, a method for gesture recognition, the method comprising:
receiving sample motion data from a sensor;
calculating a local variance if the sample motion data over a predetermined number of local variance samples;
beginning recording one or more values of the sample motion data for a gesture if the local variance scalar value is greater than a start threshold;
calculating an average local variance scalar value using the one or more values of the sample motion data for a gesture; and stopping the recording of the one or more values of the sample motion data for a gesture if the local variance scalar value is less than a stop threshold.

* * * * *